United States Patent
Kulkarni et al.

(10) Patent No.: US 11,520,636 B2
(45) Date of Patent: Dec. 6, 2022

(54) PROVISIONING SET OF MULTI-TENANT CLOUD APPLICATIONS WITH UNIFIED SERVICE

(71) Applicant: SAP SE, Walldorf (DE)

(72) Inventors: Gopalkrishna Kulkarni, Bangalore (IN); Sripad J, Bangalore (IN); Sumanth Kempegowda, Mandya (IN); Appala Naidu Uppada, Bangalore (IN)

(73) Assignee: SAP SE, Walldorf (DE)

( * ) Notice: Subject to any disclaimer, the term of this patent is extended or adjusted under 35 U.S.C. 154(b) by 74 days.

(21) Appl. No.: 16/896,822

(22) Filed: Jun. 9, 2020

(65) Prior Publication Data

US 2021/0334146 A1     Oct. 28, 2021

(30) Foreign Application Priority Data

Apr. 27, 2020    (IN) .............................. 202011017945

(51) Int. Cl.
| | |
|---|---|
| *G06F 9/50* | (2006.01) |
| *G06F 9/445* | (2018.01) |
| *G06F 8/30* | (2018.01) |
| *G06F 8/41* | (2018.01) |
| *H04L 67/00* | (2022.01) |

(52) U.S. Cl.
CPC .............. *G06F 9/5072* (2013.01); *G06F 8/31* (2013.01); *G06F 8/433* (2013.01); *G06F 9/44505* (2013.01); *H04L 67/34* (2013.01)

(58) Field of Classification Search
CPC .......... G06F 9/5072; G06F 8/31; G06F 8/433; G06F 9/44505; H04L 67/34
USPC .................................................. 709/223, 217
See application file for complete search history.

(56) References Cited

U.S. PATENT DOCUMENTS

| | | | |
|---|---|---|---|
| 9,459,925 B2 * | 10/2016 | Lawson ................ | H04L 67/142 |
| 9,509,560 B2 | 11/2016 | Chen et al. | |
| 2006/0241909 A1 * | 10/2006 | Morgan ................. | G06Q 10/06 |
| | | | 702/183 |
| 2010/0083222 A1 * | 4/2010 | Maximilien ............. | G06F 8/20 |
| | | | 717/110 |

(Continued)

OTHER PUBLICATIONS

Extended European Search Report, for EP Application No. 20213722.0-1222, dated May 25, 2021, 9 pp.

*Primary Examiner* — Emmanuel L Moise
*Assistant Examiner* — Mariegeorges A Henry
(74) *Attorney, Agent, or Firm* — Buckley, Maschoff & Talwalkar LLC

(57) ABSTRACT

According to some embodiments, methods and systems may be associated with a cloud computing environment. A unified provisioning service may include a plan configuration data store that contains information associated with a combined service representing a plurality of multi-tenant cloud applications. A cloud platform provisioning framework may receive an indication of a subscription request for the combined service from a consumer via a Software as a Service ("SaaS") marketplace and access, responsive to the received indication, a dependent service framework of the unified provisioning service. The cloud platform provisioning framework may then receive dependency subscription data from the unified provisioning service, and, based on the dependency subscription data, arrange for the consumer to be subscribed to each of the plurality of multi-tenant cloud applications.

16 Claims, 13 Drawing Sheets

(56) References Cited

U.S. PATENT DOCUMENTS

| | | | |
|---|---|---|---|
| 2012/0158821 A1* | 6/2012 | Barros | G06F 16/254 709/203 |
| 2017/0063615 A1* | 3/2017 | Yang | H04L 41/5054 |
| 2020/0073979 A1* | 3/2020 | Bandyopadhyay | G06F 16/835 |

* cited by examiner

```
{
  "appId": "api-portal-xsuaalb9783",
  "appName": "apiportal-apimdt-cf-cipro-it-reuse",
  "appUrls": {
    "getDependencies": "https://<saas getDep callback URL>",
    "onSubscription": "https://<saas subscribe callback>/{tenantId}" // It is mandatory to handle PUT and DELETE to support subscription and unsubscription.
  }
}
```

FIG. 8

```
[
    {
        "capabilityName": "...",        # A descriptive capability name maintained by provisioning
                                          application owner.
        "appId": "...",                 # The xsappname of the reuse service which the application
                                          consumes.
        "appName": "...",               # Name of the re use service created in LPS
        "customDomain": "...",          # Custom domain used by application for routing
        "responseUrlPattern": "...",    # Example <consumer_subdomain>.customdomain>/ica
        "customParams": {
            "param1":"value1"
        }
    }
]                                                                                            — 910

{
    "capabilityName": "api_mgt",
    "appId": "api-portal-xsuaalb9783",
    "appName": "apiportal-apimdt-cf-cipro-reuse",
    "customDomain": "must be inserted as part of System set up",
    "responseUrlPattern": "<consumer_subdomain>.<customdomain>.<datacenterdomain>/apiMgt"
}                                                                                            — 920
```

PROVISIONING SET OF MULTI-TENANT CLOUD APPLICATIONS WITH UNIFIED SERVICE

BACKGROUND

An enterprise may utilize a cloud computing environment to let users perform tasks. For example, the enterprise might let various users execute an application via the cloud computing environment to process purchase orders, adjust human resources information, generate invoices, etc. In some cases, the cloud computing environment will support multiple tenants and onboard applications using multiple microservices (e.g., one microservice might be associated with a user interface while another microservice handles database resources). In some cases, a Cloud Platform Integration ("CPI") may act as middleware for applications or systems in integration scenarios. Note that an integration scenario may involve sender and/or receiver systems along with a sequence of steps to convert, enrich, and/or modify data flowing though the different systems. An integration flow developer may, for example, be responsible for manually defining an integration scenario using CPI web tooling, such as a design service. Once the integration scenario is complete, it may be built and deployed (e.g., using a generation and build service) to consumers (tenants of the appropriate account in the cloud platform) who can subscribe to the application through a marketplace user interface (e.g., showing tiles of available application).

Typically, the default provisioning offered by a cloud platform does not allow for the grouping of related services (e.g., multiple services that should logically be offered as a package of combined services) is in a unified way. Instead, a consumer must select related services one-by-one and provision them. Moreover, the consumer must then later manage them separately. For example, a cloud platform marketplace may offer service tiles, and a customer can buy a package that includes several different services. He or she must first discover all of those relevant services associated with the package (e.g., by consulting documentation) and subscribe to them one-by-one. The consumer must then later manage them separately, such as by adding or removing user access, repeatedly. This can be a time consuming and error prone task, especially when a substantial number of services or applications are involved.

It would therefore be desirable to provision a combined set of applications for a multi-tenant cloud computing environment in a secure, automatic, and efficient manner.

SUMMARY

According to some embodiments, methods and systems may be associated with a cloud computing environment. A unified provisioning service may include a plan configuration data store that contains information associated with a combined service representing a plurality of multi-tenant cloud applications. A cloud platform provisioning framework may receive an indication of a subscription request for the combined service from a consumer via a Software as a Service ("SaaS") marketplace and access, responsive to the received indication, a dependent service framework of the unified provisioning service. The cloud platform provisioning framework may then receive dependency subscription data from the unified provisioning service, and, based on the dependency subscription data, arrange for the consumer to be subscribed to each of the plurality of multi-tenant cloud applications.

Some embodiments comprise: means for storing, in a plan configuration data store of a unified provisioning service, information associated with a combined service representing a plurality of multi-tenant cloud applications; means for receiving at a cloud platform provisioning framework, an indication of a subscription request for the combined service from a consumer via a Software as a Service ("SaaS") marketplace; means for accessing, responsive to the received indication, a dependent service framework of the unified provisioning service; means for receiving, at the cloud platform provisioning framework, dependency subscription data from the unified provisioning service; and based on the dependency subscription data, means for arranging for the consumer to be subscribed to each of the plurality of multi-tenant cloud applications.

Some technical advantages of some embodiments disclosed herein are improved systems and methods to provision a combined set of applications for a multi-tenant cloud computing environment in a secure, automatic, and efficient manner.

BRIEF DESCRIPTION OF THE DRAWINGS

FIG. 8 is an example of a configuration JSON according to some embodiments.

FIG. 9 is an example of a re-use service configuration JSON in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In a multi-cloud environment, the applications (e.g., SaaS applications) may be discoverable in a service-marketplace. The consumer may subscribe to these services if his or her global account has the necessary eligibility (e.g., if the service is purchased). The list of available SaaS applications can be substantial (e.g., it can contain hundreds of applications). Usually, customers buy packages that make them eligible for more than one service (e.g., a set of services might be combine and sold as a single package). The architecture of a cloud platform, however, might not offer a grouped provisioning of these services. Instead, a consumer might need to select each service and provision it before moving to other related services. Such an approach can have the following problems:

- time consumption (the consumer needs to discover the services one-by-one and subscribe to them),
- repeated user management (after provisioning a service, the consumer must give access to these services repeatedly to himself or herself—or even some other developer), and
- a single page view of the provisioned services may not be available (the cloud platforms generally offer a global account dashboard which shows all provisioned applications, but an administrator who is only interested in a packaged service might not be able to view a consolidated dashboard).

Figure 1:
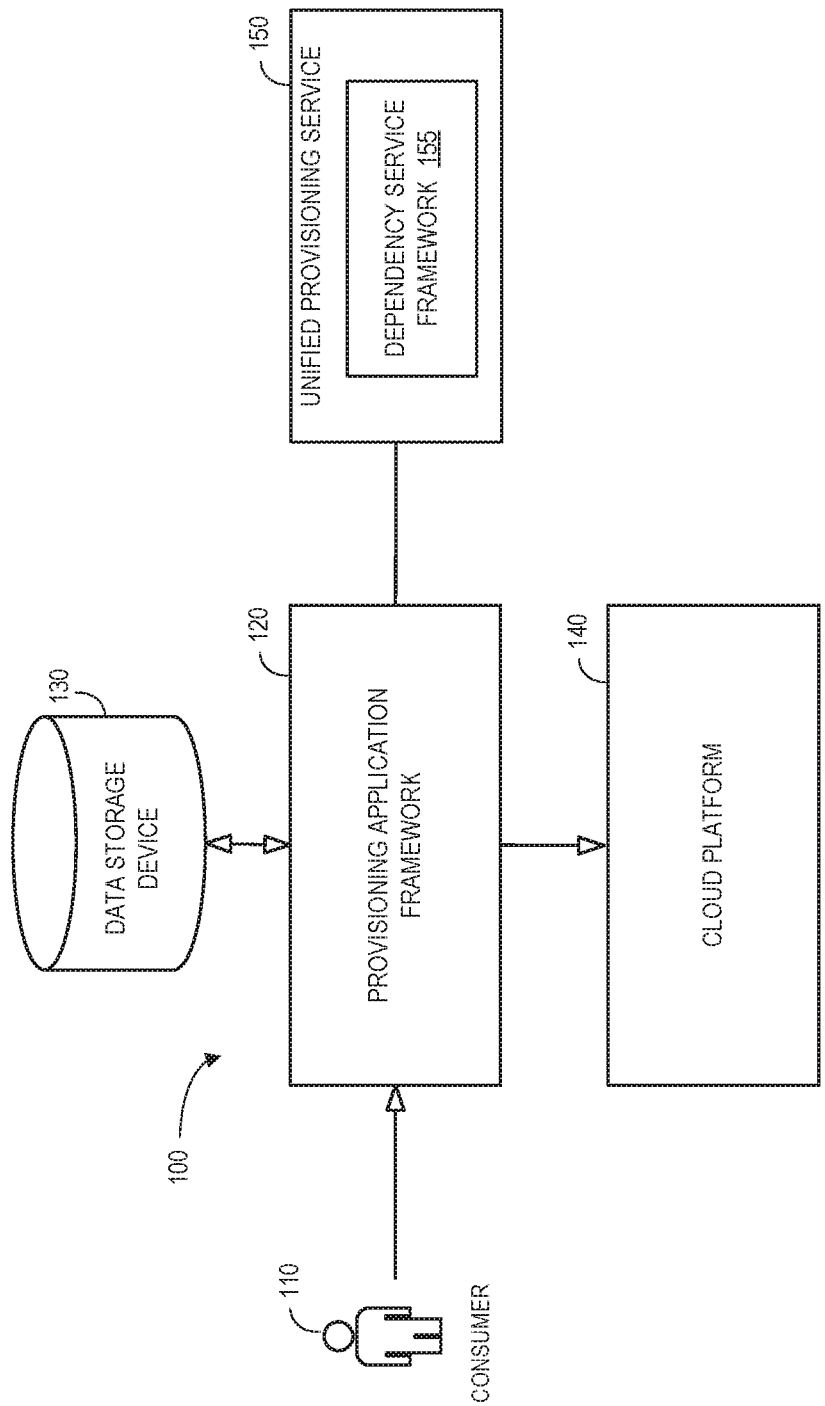
FIG. 1 is a high-level block diagram of a system in accordance with some embodiments.

To avoid this, embodiments may combine dependent service provisioning into one unified provisioning approach using a new framework. The framework may contain dependent service configuration information based on which appropriate User Interface ("UI") will be rendered (taking the configuration values and delegating the subscription to the cloud platform). For example, FIG. 1 is a high-level block diagram of a system 100 in accordance with some embodiments. The system 100 includes a provisioning application platform 120 that accesses information in a data storage device 130. The provisioning application platform 120 might use this information, for example, to create an integration service for a consumer 110 associated with a tenant or customer. The provisioning application platform 120 may communicate with a cloud platform 140 to create an integration service from microservices. Moreover, according to some embodiments a unified provisioning service 150 with a dependency service framework 155 allows for a unified combination of applications. This process might be performed automatically or be initiated via a command from a remote interface device. As used herein, the term "automatically" may refer to, for example, actions that can be performed with little or no human intervention.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The provisioning application platform 120 may store information into and/or retrieve information from various data stores (e.g., the data storage device 130), which may be locally stored or reside remote from the provisioning application platform 120. Although a single provisioning application platform 120 and cloud platform 140 are shown in FIG. 1, any number of such devices may be included. Moreover, various devices described herein might be combined according to embodiments of the present invention. For example, in some embodiments, the data storage device 130 and the provisioning application platform 120 might comprise a single apparatus. Any of the system 100 functions may be performed by a constellation of networked apparatuses, such as in a distributed processing or cloud-based architecture.

A user or administrator may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define combinations of applications) and/or provide or receive automatically generated recommendations or results from the system 100. In some cases, a cloud platform integration may be built using a microservice architecture (e.g., the underlying cloud platform 140 may comprise CLOUD FOUNDRY®).

Figure 2:
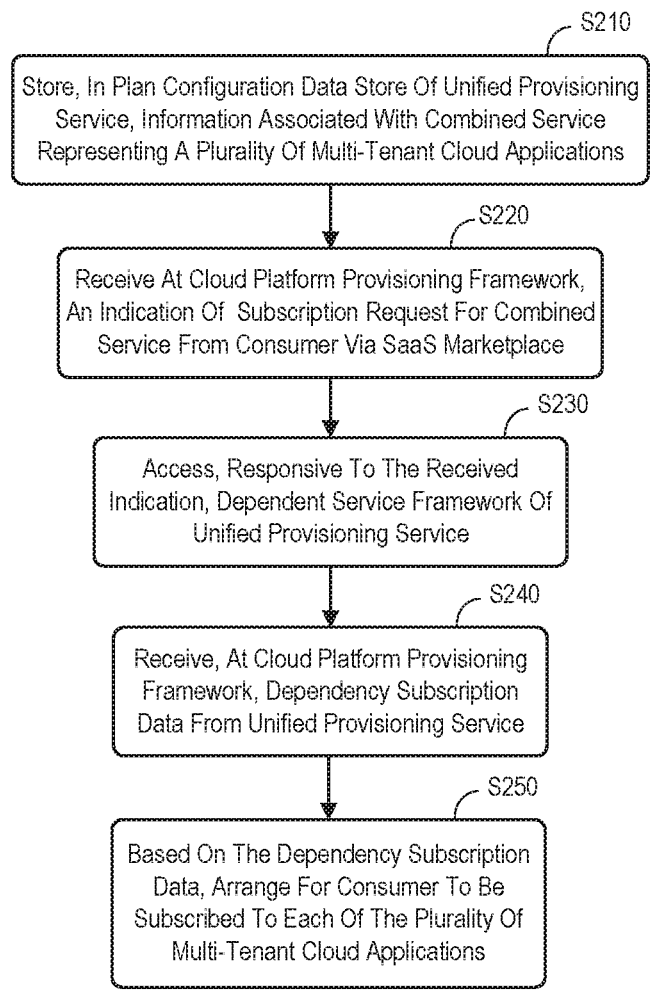
FIG. 2 is a method according to some embodiments.

FIG. 2 is a method that might performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Figure 3:
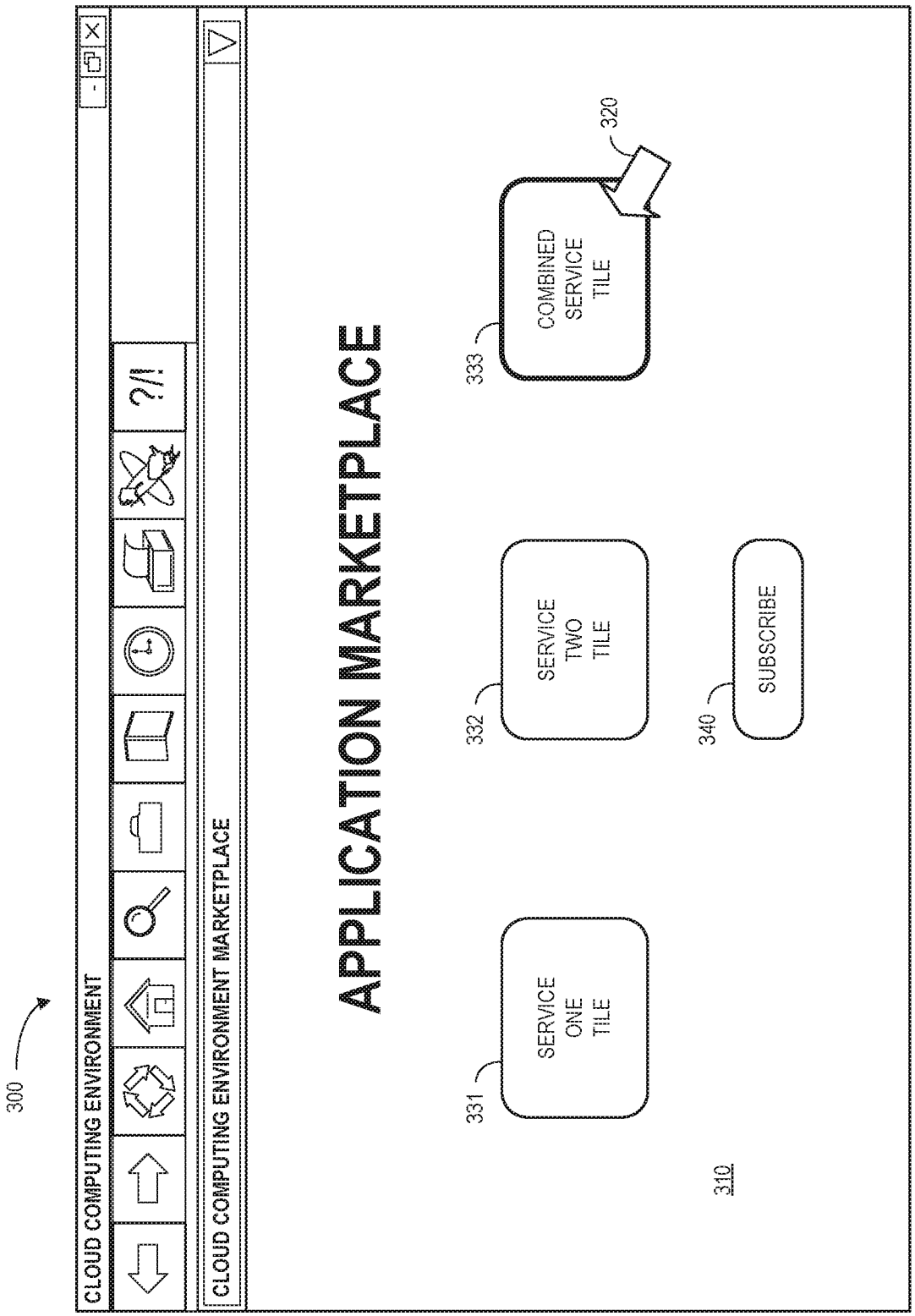
FIG. 3 is an application marketplace display in accordance with some embodiments.

At S210, the system may store, in a plan configuration data store of a unified provisioning service, information associated with a combined service representing a plurality of multi-tenant cloud applications. At S220, a cloud platform provisioning framework may receive an indication of a subscription request for the combined service from a consumer via a SaaS "marketplace." FIG. 3 is an application marketplace display 300 in accordance with some embodiments. The display 300 includes a selection area 310 with a service one tile 331 and a service two tile 332 that may be selected by a consumer (e.g., via a touchscreen or computer mouse pointer 320). According to this embodiment, the display 300 further includes a "combined service tile" 333 that can be selected by the consumer to subscribe 340 to both the first and second service in a unified fashion.

Referring again to FIG. 2, at S230 the system may access, responsive to the received indication, a dependent service framework of the unified provisioning service. At S240, the cloud platform provisioning framework may receive dependency subscription data from the unified provisioning service. Based on the dependency subscription data, the system may arrange for the consumer to be subscribed to each of the plurality of multi-tenant cloud applications at S250. In this way, embodiments may help provision a combined set of applications for a multi-tenant cloud computing environment in a secure, automatic, and efficient manner.

In this way, embodiments may provide a new tile for unified provisioning in a cloud platform service marketplace. For example, a sales team may decide that service A and service B should be sold as combined offering (but would like to continue supporting the existing independent offerings A and B as well). In this case, a new plan may be introduced which results in a new tile, referred to as a "combined service" tile. Embodiments may implement a service owner provisioning application for subscription handling, and the associated dependencies may be maintained as configuration information. Upon subscribing the combined service, the provisioning application may offer the selection of the dependent service to be on-boarded. Upon selection, the provisioning application UI may also offer user input which will be sent to a dependent service as part of a dependent service subscribe call. The cloud platform provisioning framework may then subscribe to these as dependent service and provide lifecycle management (e.g., out of the box).

Figure 4:
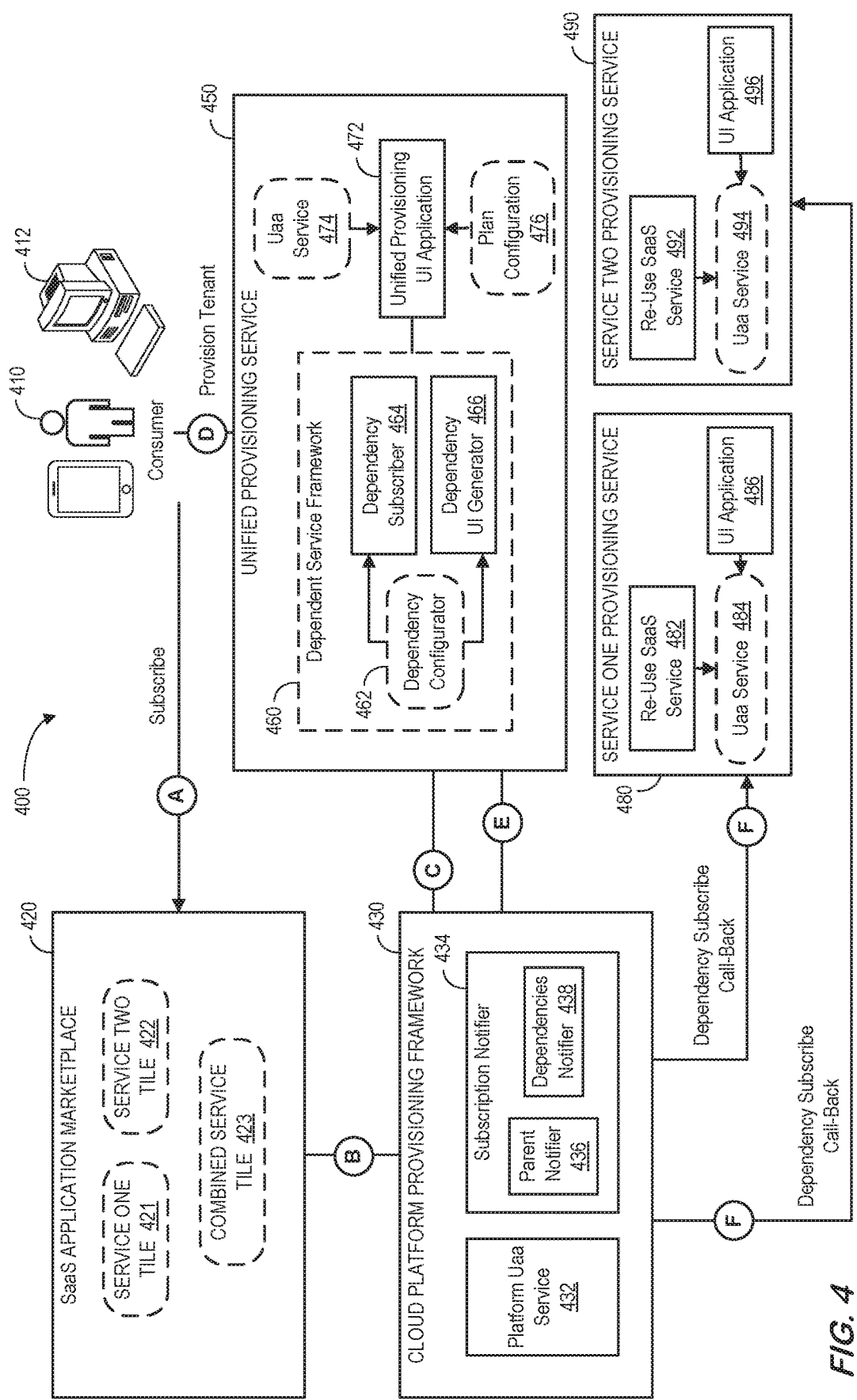
FIG. 4 is a more detailed system architecture diagram according to some embodiments.

FIG. 4 is a more detailed system 400 architecture diagram according to some embodiments. The system 400 includes a consumer 410 and associated consumer devices 412 that access a SaaS application marketplace 420 containing a service one tile 421, a service two tile 422, and a combined service tile 423. The cloud platforms may offer SaaS application subscriptions as part of the marketplace 420. When the consumer 410 subscribes to the combine service tile 423 at (A), a cloud platform provisioning framework 430 may be notified at (B). The cloud platform provisioning framework 430 may notify a unified provisioning service at (C), via a subscription call-back, which can then provision an appropriate tenant for the consumer 410 at (D). A dependency service framework 620 may use a dependency configurator 462 dependency subscriber 464, and dependency UI generator 466 to return the appropriate dependency subscription information to the cloud platform provisioning framework 430 at (E). Note that the unified provisioning service 450 may further utilize a unified provisioning UI application 472, User account and authentication ("Uaa") service 474, and/or a plan configuration 476 during the process.

The cloud platform provisioning framework 430 may then use the dependency subscription information, a platform Uaa service 432, and subscription notifier 434 (e.g., including a parent notifier 436 and a dependencies notifier 438) to issue dependency subscribe call-backs to the appropriate service provisioning services at (F). For example, in the case of the combined service tile 423, dependency subscribe call-backs may be issued to a service one provisioning service 480 (e.g., with a re-use SaaS service 482, Uaa service 484, and a UI application 486) and a service two provisioning service 490 (e.g., with a re-use SaaS service 492, Uaa service 494, and a UI application 496). In this way, the consumer 410 can access the appropriate services in a unified fashion.

Note that a SaaS application service owner can implement some contracts of the cloud platform. For example, a service owner might on-board a tenant by providing implementation in the form of a REST call-back. Moreover, the cloud platform provisioning framework 430 may be bound to the application marketplace 420. When the consumer 410 discovers a service and subscribes to it, the cloud platform provisioning framework 430 may be informed and make a call to the call-back implementation of the service owner. The service owner then on-boards the service and provides the service URL as a response. The cloud platform provisioning framework 430 may also offer the subscription of dependent service. Note that most providers assume the dependent services are non-UI based (and hence do not support the URL as a response). Some embodiments described herein may solve this problem by providing a convention over configuration approach where the dependent services' configuration are maintained in a simple Domain Specific Language ("DSL") or similar structure. Using this configuration, the dependent service's end point URL may be constructed by the provisioning application and rendered to the consumer 410 as appropriate.

The plan configuration 476 may be used to render only relevant configurations in the UI. For example, a standard plan may have limited dependent services compared to a premium version. The provisioning application may receive the plan information as part of a cloud platform provisioning framework 4430 as a call-back. Based on this, the UI may be decorated in connection with a dependency UI generator.

According to some embodiments, participating dependent services may implement a re-use contract offered by the cloud platform. This may be the same contract as that of SaaS applications (but without linking to the application marketplace tile). In such an implementation, the dependent service may be eligible to receive the subscription call-back from cloud platform provisioning framework 430. Upon receiving the call-back, the service owner may implement an on-boarding process and provide a final status to the cloud platform provisioning framework 430. This status may be periodically polled by the unified provisioning service 450. Upon success, the UI may be rendered using the dependent service URL.

One example implementation will now be described. Note, however, that embodiments may be associated with any number of other implementations. A Cloud Platform Integration ("CPI") suite may provide a suite experience to customers. Some embodiments may provision this integration suite service using a single, unified SaaS application tile.

The integration suite may provide one holistic experience including on-boarding and consuming the following services:
Cloud Platform Integration (CPI),
CPI Embedded Enterprise Messaging Service (EMS),
Integration Content Advisor (ICA),
API Management, and
Open Connectors.

Note that all the services of the integration suite may be independent of each other. This includes ICA as well because the product requirement is to offer its activation independently to the CPI tenant. In addition, the EMS may be a Platform as a Service ("PaaS") (service broker) and activation of this service may be dependent on CPI tenant activation. Some embodiments may offer a re-use service construct. All of the required services to be bundled may fall under SaaS application constructs. The re-use service may be utilized to subscribe to these dependent services via provisioning application. The basic requirements of dependent service from CPI point of view can be categorized as:
Get the on-boarding PUT call-back details like Global Account ID, sub-domain, etc.
Establish microservice-to-microservice communication (i.e., CPI service may like to access the dependent service Application Programming Interfaces ("APIs")).
Provide a seamless onboarding experience.

Some embodiments may onboard a dependent service. For example, a dependent service may be onboarded as a SaaS call-back. In this case, the cloud platform may offer a PUT call back to the dependent service with the same Quality of Service ("QoS") as that of a SaaS service. The dependent service may the implement call back handling and onboard a tenant upon receiving them. This option has two variants, with a first variant using on-demand to get an appropriate dependencies invocation. In this option, a subscription is triggered upon clicking of the activating button. The dependent service subscriptions may or may not be required but can be assigned on-demand. It does not couple with CPI tenant onboarding. A second variant may subscribe during CPI tenant subscription only. This option means that either that either the CPI tenant and all dependent services are subscribed or none (that is, the entire subscription fails or succeeds). Some advantages of these approaches include that they may be aligned with existing cloud provisioning architecture and most of these services may already be implemented as call-backs for their stand-alone use case (and can leverage the same). Moreover, there may be no necessity for the provisioning application to re-construct a SaaS PUT payload and life cycle management (e.g., subscribe, terminate, and/or unsubscribe) may be available out of the box. In addition, one-to-one mapping of a sub-account to a subscription may be offered out of the box. Disadvantages of this approach might include that there may be no support for additional attributed as part of onboarding call, convention over configuration approach needs to be followed to render the dependent service URL, and more UI steps may be required for appropriate role/trust configuration.

Other embodiments may onboard a dependent service as a service broker call-back. In this approach, the dependent service(s) implement the service broker interface and get an onboarding call-back via a broker contract. The provisioning application may construct the on-boarding callback payload and delegate the broker instance creation via a Tenant Resource Manager ("TRM"). The TRM may then create a service instance passing the on-boarding information as additional parameters. Upon decommissioning, the provisioning may ask the TRM to delete this instance. Some advantages of this approach include the fact that the service broker instance creation can be used for CPI to dependent service communication and may support additional parameters during onboarding. Disadvantages may include the fact that the one-to-one mapping of a sub-account to a subscription may need to be handled explicitly (e.g., the system may make that sure only one instance of the service broker is created because the instance creation is calling on the onboarding script of the dependent service). Moreover, the approach may enforce the implementation of a service broker by the dependent service. Note that the clone created cannot be used for the SaaS subscription use case. That means the system may use the master for the subscription (and the clone created will simply be unused unless there are other use cases supported). This approach may also require more UI steps with respect to role and/or trust configuration.

Still other embodiments may onboard a dependent service using co-deployment in the same provider account. In this approach, all dependent services may be bound with once master Uaa and/or an app-router. Moreover, the deployment may be in a single provider account. Advantages this approach include the fact that more UI steps issue can be solved out of the box, integration suite harmonization may be more logical, and/or a better user experiences may be provided out of the box (e.g., a single XSUAA for all suite applications might bring a smooth user experience). However, note that CPI has a multi-system need, and this may not be the case for another dependent service. Instead, the system may be forced to set up a multisystem for them as well (which might be a cost concern). Moreover, the migration of existing tenants may be required for a new deployment or when a dual deployment needs to be maintained (and the dual deployment may be associated with data consistency challenges).

This example implementation will utilize the SaaS re-use service call-back approach for onboarding the capabilities. Note that there are basically two options for integration suite provisioning applications. The first option may re-use the current CPI provisioning application. In this approach, the existing SaaS registry instance of the CPI will be re-used with different PLANs being contributed. The CPI provisioning implementation already is based out of PLAN id. Any additional UI can be offered using the plan segregation. As a result, the option may require less implementation effort with respect to CPI onboarding (and provide a better user experience compared to other options). A drawback oft his option is the fact that role harmonization may need to be implemented. For example, the CPI roles will be available after the subscription (which may be not accurate).

The second option may create a new provisioning application (e.g., app name, SaaS registry instance, and XSAPP). In this approach, the CPI system acts as a re-use capability. A re-use service may be created bound to CPI XSAPP. This option further has two variants: (1) on subscription call-back of CPI, simply show the CPI provisioning's go-to application URL, and (2) re-design the CPI onboarding call-back by moving it to an asynchronous design (the CPI onboarding will be triggered asynchronously on subscribe call-back). This option may provide a clean separation (and also provide a new SaaS registry instance bound to its own XSUAA) and conform to a multi-system architecture. However, the approach may provide a broken user experience (as far as CPI is concerned) and require a substantial amount of effort.

Figure 5:
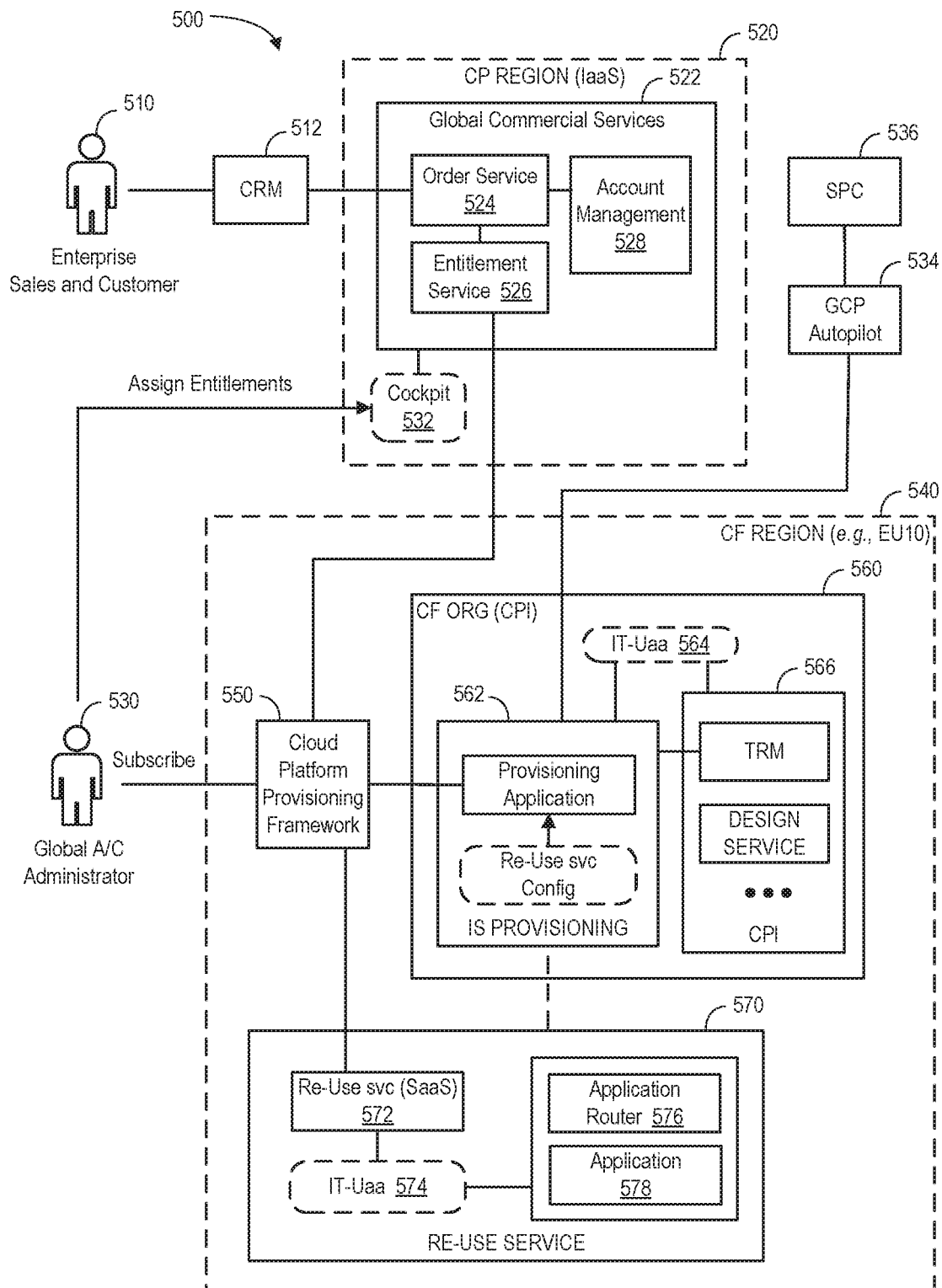
FIG. 5 is one example of an integration suite implementation in accordance with some embodiments.

Some embodiments may extend an existing CPI provisioning application to meet the integration suite requirements. After a successful subscription, the user may be given the capability service's landing page where he or she can further configure (for API management) or directly access (for an Integration Content Advisor ("ICA")). The onboarding call-backs for dependent capabilities may be triggered on explicit UI action of the user. FIG. 5 is one example of an integration suite implementation 500 in accordance with some embodiments. A user 510 may access an Infrastructure as a Service ("IaaS") 520 for a Cloud Platform ("CP") region via a Customer Relationship Management component 512. The IaaS 520 may include Global Commercial Services ("GCS") (e.g., an order service 524, an entitlement service 526, and account management 528) along with a cockpit 532, GCP autopilot 534 and SPC 536.

A global account administrator 530 may assign entitlements to the cockpit 532 and interact with a could platform provisioning framework 550 of a Cloud Foundry ("CF") region 540. A CPI 560 may include Integration Suite ("IS") provisioning 562, Uaa 564, and CPI 566 (e.g., with TRM, a design service, etc.). A re-use service 570 may include a re-use service SaaS 572, Uaa 574, application router 576, and/or an application 578. Note that all packaged services of the integration suite might use the CIS SaaS re-use construct. A small re-usable service configuration framework may be introduced in the provisioning application to streamline the subscription of re-usable services. The high-level participants of the integration suit provisioning, therefore, are provisioning application, dependent re-use services. The re-use services (also termed as capabilities of integration suite) can be independently subscribed via the provisioning application. The provisioning application maintains a configuration of these re-use services. The configuration is mainly to identify the re-use service's name, XSAPPID, and the response URL pattern. Upon subscribing to the provisioning application, a user may select the required capabilities and subscribe to them.

Figure 6:
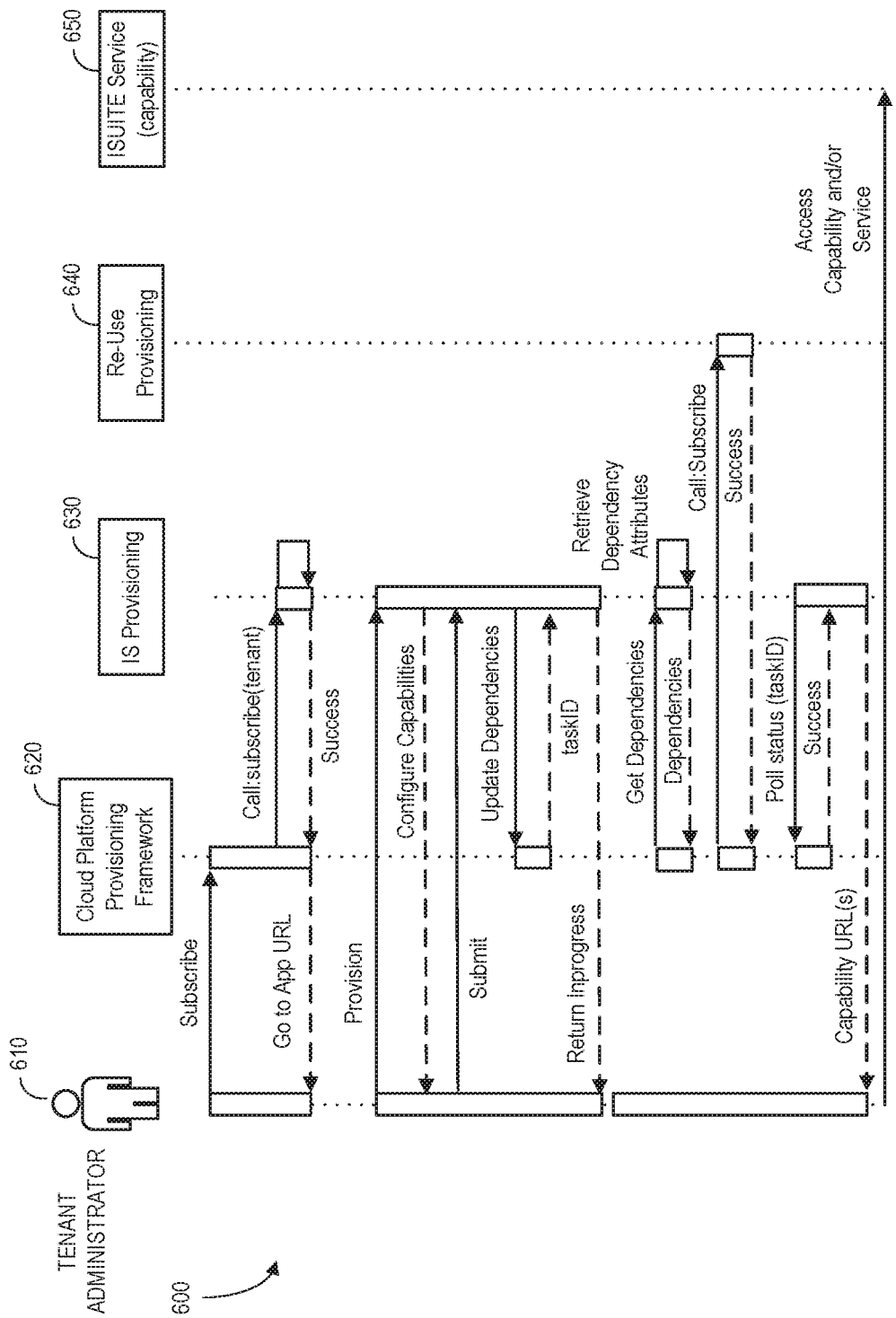
FIG. 6 is a sequence diagram of one example implementation according to some embodiments.

FIG. 6 is a sequence diagram 600 of one example implementation according to some embodiments. A tenant administrator 610 may send a subscription to a cloud platform provisioning framework 620. A provisioning application 630 may then call an updateDependency API on the selection of the capability activation. The cloud platform provisioning framework 620 provides a TaskID to poll the status. The provisioning application 630 polls the status (e.g., for a synchronous process the timeout may be 30 sec and for an asynchronous process the time might be service-owner configured) and decorates the UI accordingly. Note that the cloud platform provisioning framework 620 may send a call:subscribe to a re-use provisioning component 640 (which may return an indication of success). Upon completion of the sequence diagram 600, an iSuite service 650 may receive access capability and/or service as appropriate.

In connection with CPI Onboarding, in the context of an integration suite, the CPI may also be a capability. Two design approaches might include:
  use a re-use service for CPI system, and
  do not use a re-use service for CPI system.
When utilizing a re-use service, a better segregation of roles may be possible (but might be difficult to implement). Not utilizing a re-use service may comprise a lesser effort as far as implementation is concerned. This option also has an advantage on the CPI tenant onboarding experience. According to some embodiments, the integration suite provisioning application architecture may be extendable for both designs. Depending on the amount of effort, a suitable option can be selected.

A re-use service in the context of the integration suite may be defined as "a SaaS service (implement with on-boarding callbacks) that can either exist independently with a commercialized tile or as a standalone only for CPI use case. A re-use service may have a UI with an XSUAA of its own. Note that a re-use service may live in its own CF provider account and be managed independently (software life cycle). A re-use service may have its own billing module and a stable URL following a fixed convention for accessing the service. Two types of re-usable services might be provided:
  A service embedded as part of a capability (e.g., enterprise messaging and connectivity services), and
  SaaS services existing independently in the service marketplace.
Moreover, a re-usable service may have the following needs:
  on-boarding data of the tenant (e.g., subaccount, subdomain, plan, GA etc.), and
  dynamic entitlement data (which may change on use cases such as up-sell/down-sell and hence there may be a way for re-useable services to get this data on demand).

Figure 7:
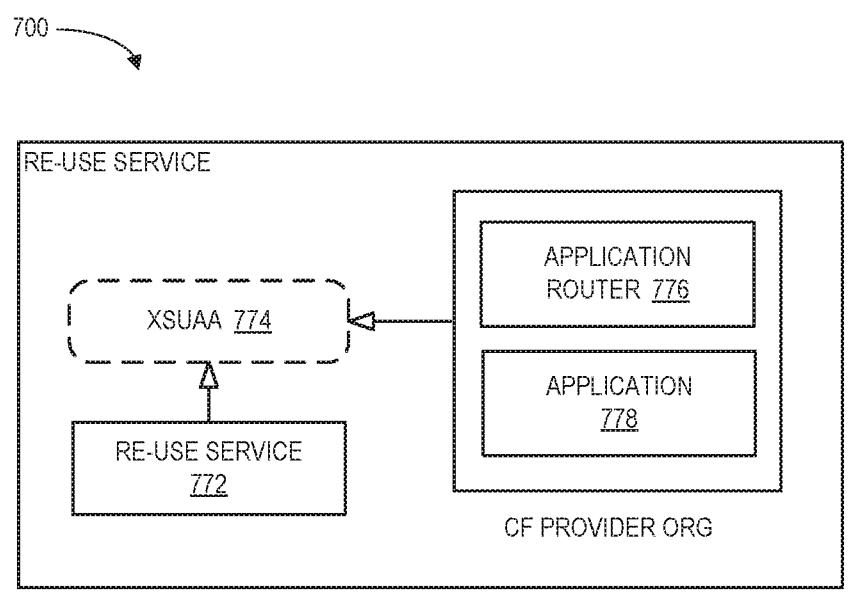
FIG. 7 is a re-use service for a SaaS in accordance with some embodiments.

Some embodiments use the SaaS subscription call-back data for on-boarding data of the tenant and directly talk to CIS to get the entitlement using the API. For example, FIG. 7 is a re-use service 700 for a SaaS in accordance with some embodiments. In particular, an XSUaa 774 may receive information form a re-use service 772 and a CF provider organization including an application router 776 and an application 778.

With respect to a re-use service contract with a provisioning application, note that a Re-use service may have a UI app that will be bound to an XSUaa. The XSUaa must be of type <broker>. A dependent service may create a re-use service with the following naming convention: <applicationName>-it-reuse for example for API management. FIG. 8 is an example of a configuration JavaScript Object Notation ("JSON") according to some embodiments. Note that the call-back implementation may be idempotent (e.g., an element of a set which is unchanged in value when multiplied or otherwise operated on by itself), and the integration suite getDependency( ) may call the subscribe callback multiple times. Note that the provisioning application might not handle an explicit time out. It need not be because the CIS API anyways handles the time out for both synchronous (e.g., 30 sec) and asynchronous (e.g., configured by re-use service owner).

A dependent service URL pattern may be associated with a convention over configuration approach for rendering the re-use service endpoint URL in the provisioning application. For this use case, the pattern of the URL may be stable and should not change per subscription. This pattern can be provided to provisioning application. Note that the provisioning application may need to be aware of re-use service configuration. The following three attributes of the re-use service might be maintained in the provisioning application:
  response URL pattern,
  reuse service name, and
  re-use service XSAPPID.
FIG. 9 is an example 900 of a re-use service configuration JSON in accordance with some embodiments. In particular, FIG. 9 includes a re-use service configuration JSON 910 and an example for API management 920. The additional parameters may be defined for extension purposes. During subscription call-back, the re-use services may require user inputs. Note that one-to-one mapping with sub-account subscription may be supported by a re-use service owners' callback implementation (and the re-attempt of a subscription should fail). Moreover, all QoS and contract with respect to SaaS call-back handling may be honored (i.e., upon unsubscribing deletion of user data and compliance must be ensured).

In connection with one subscription per sub-account, a SaaS check might be be implemented in two ways:
  an integration suite provisioning application, and
  independent services to a check in the call-back.
According to some embodiments, a CIS integration for the following three types may need to be performed for the integration suite:
  a subscription-based account,
  a Cloud Contract Enterprise Agreement ("CPEA") contract, and
  a trial basis.
For the option of re-using an existing CPI provisioning application, some embodiments may simply re-use an existing SaaS registry.

Figure 10:
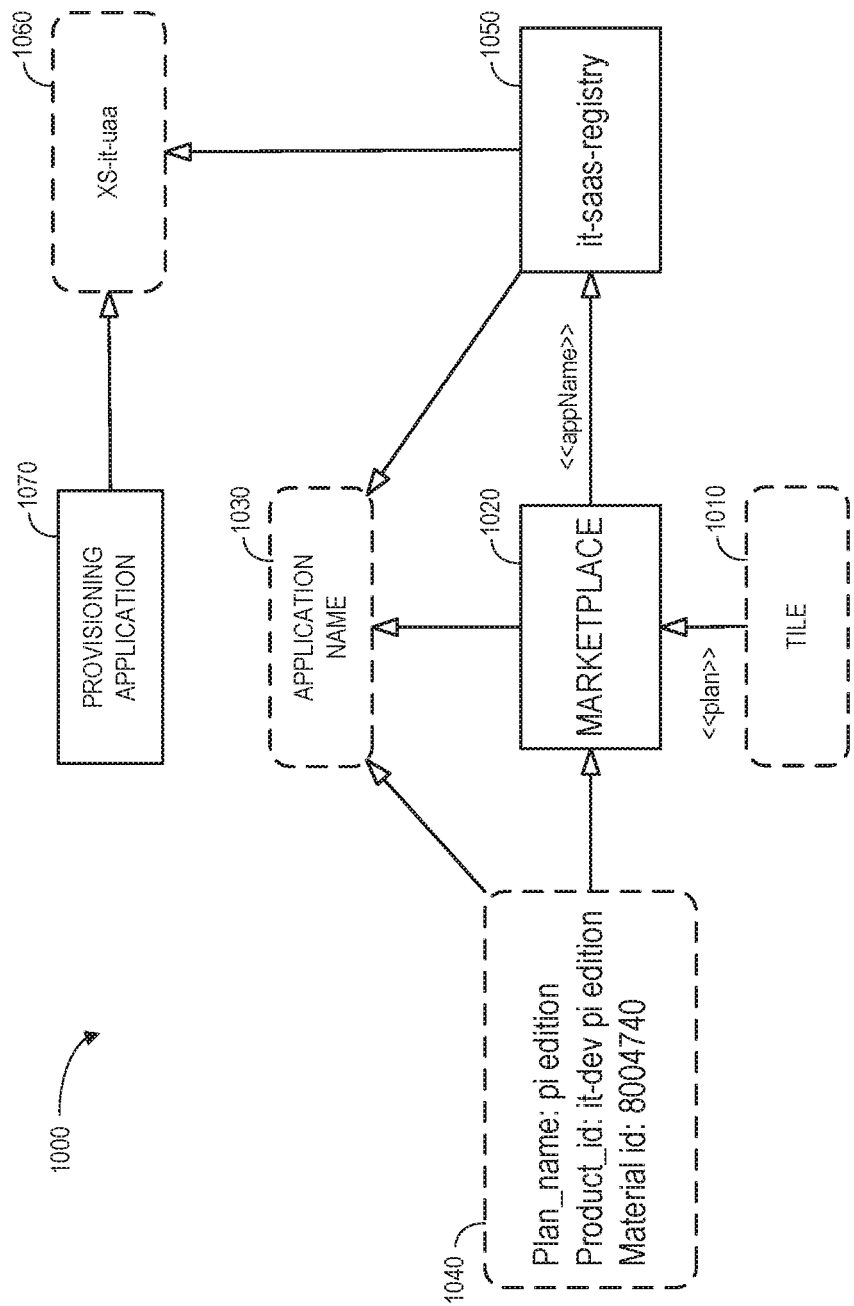
FIG. 10 illustrates re-use of an existing SaaS registry instance of CPI provisioning according to some embodiments.

With respect to how an existing SaaS registry instance of CPI provisioning might be re-sued, FIG. 10 illustrates 1000 re-use of an existing SaaS registry instance of CPI provisioning according to some embodiments. As shown in FIG. 10, an application name 1030 may receive a plan name, product identifier, and material identifier 1040, it-SaaS-registry 1050 and a tile 1010 <<plan>> via a marketplace 1020. The it-SaaS-registry 1050 may also interact with a provisioning application 1070 via an CX-it-Uaa 1060. In this way, a single SaaS registry instance can be used for multiple plans (and the integration suite may represent a new plan). The system may commercialize new plans of the integration suite with matching material IDs; while commercializing embodiments may link these plans to the same application name 1030 as that of CPI and start receiving the subscription call-backs normally.

Figure 11:
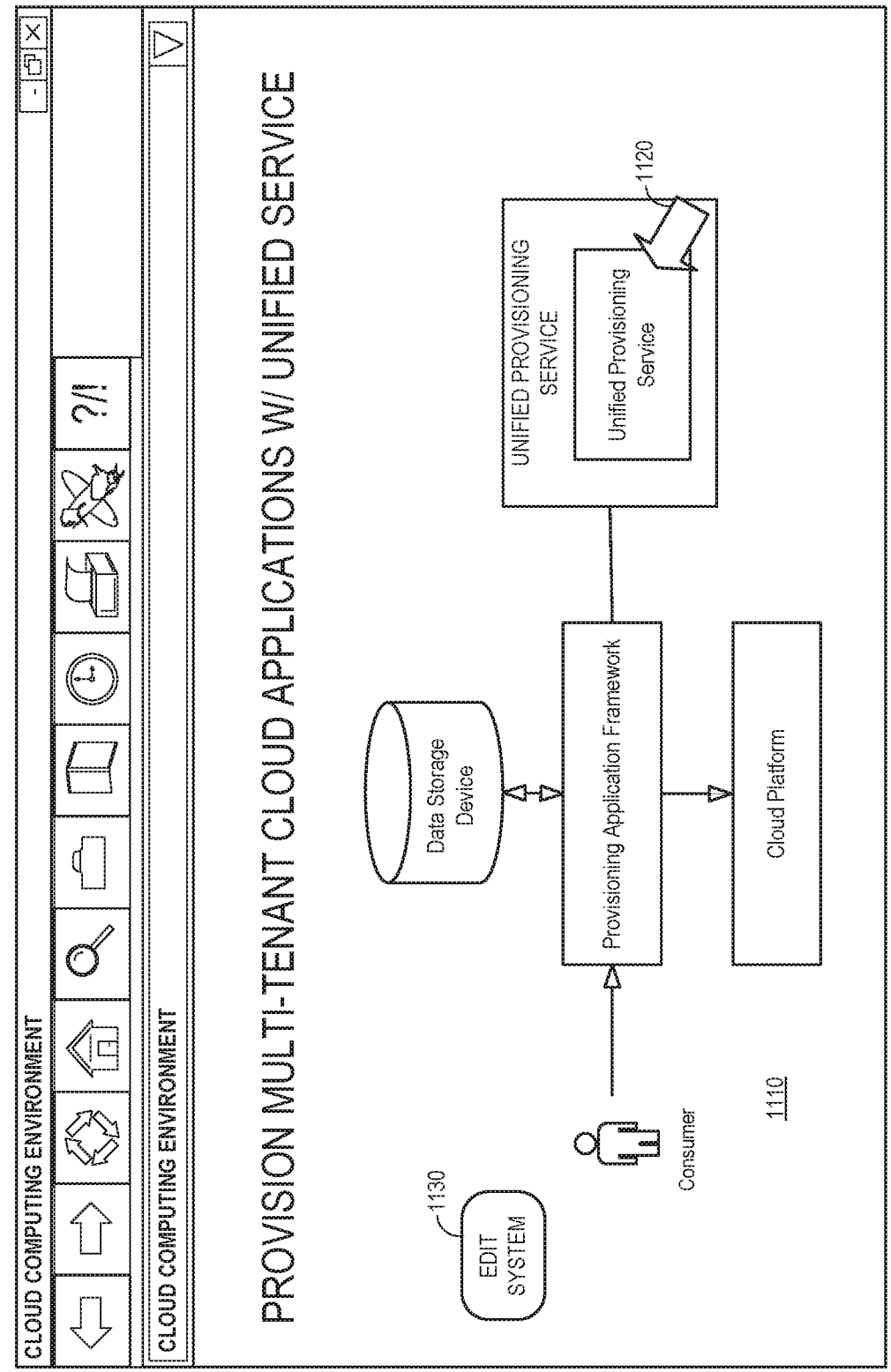
FIG. 11 is a human machine interface display according to some embodiments.

FIG. 11 is a human machine interface display 1100 in accordance with some embodiments. The display 1100 includes a graphical representation 1110 of a provisioning system in accordance with any of the embodiments described herein. Selection of an element on the display 1100 (e.g., via a touchscreen or a computer pointer 1120) may result in display of a pop-up window containing more detailed information about that element and/or various options (e.g., to add a microservice, modify a combined unified provisioning service, etc.). Selection of an "Edit System" icon 1130 may also let an operator or administrator adjust the operation of the provisioning system.

Figure 12:
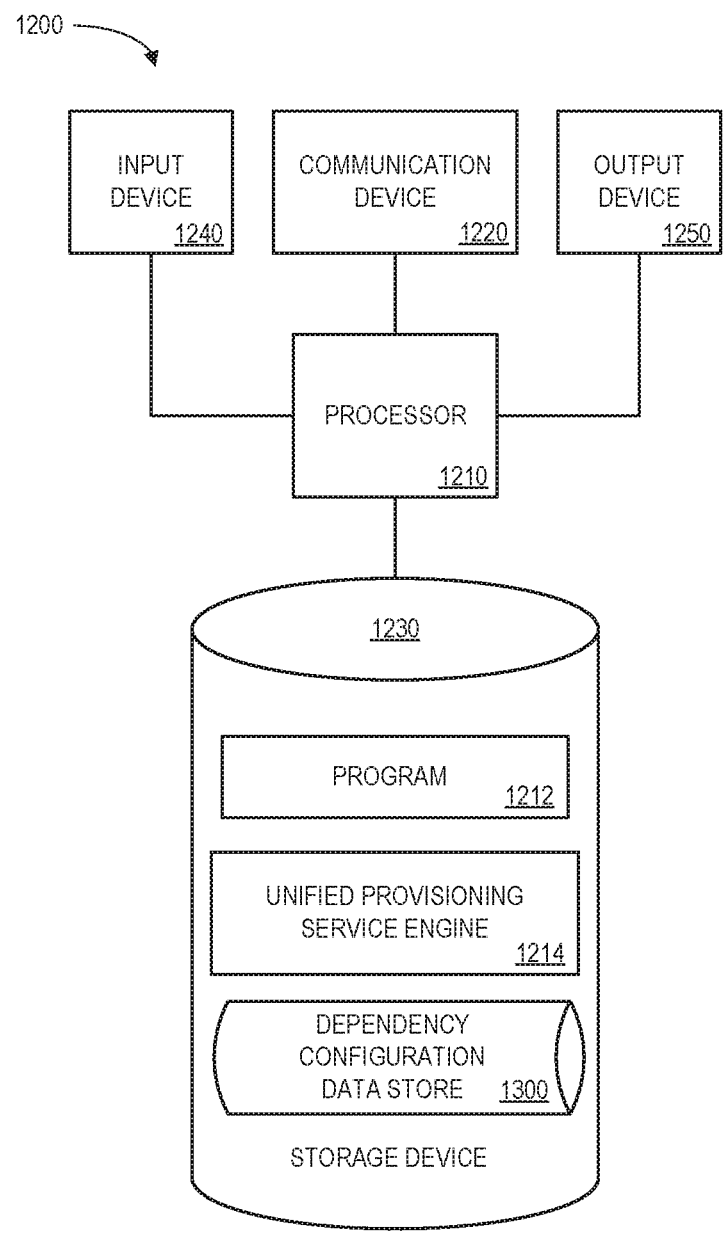
FIG. 12 is an apparatus or platform according to some embodiments.

Note that the embodiments described herein may also be implemented using any number of different hardware configurations. For example, FIG. 12 is a block diagram of an apparatus or platform 1200 that may be, for example, associated with the systems 100, 400 of FIGS. 1 and 4, respectively (and/or any other system described herein). The platform 1200 comprises a processor 1210, such as one or more commercially available Central Processing Units ("CPUs") in the form of one-chip microprocessors, coupled to a communication device 1260 configured to communicate via a communication network (not shown in FIG. 12). The communication device 1260 may be used to communicate, for example, with one or more remote user platforms, administrator platforms, etc. The platform 1200 further includes an input device 1240 (e.g., a computer mouse and/or keyboard to input microservice and integration service information) and/an output device 1250 (e.g., a computer monitor to render a display, transmit recommendations or alerts, and/or create reports about integration services, tenants, users, etc.). According to some embodiments, a mobile device or PC may be used to exchange information with the platform 1200.

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or a unified provisioning service engine 1214 for controlling the processor 1210. The processor 1210 performs instructions of the programs 1212, 1214, and thereby operates in accordance with any of the embodiments described herein. For example, the processor 1210 may access a plan configuration data store that contains information associated with a combined service representing a plurality of multi-tenant cloud applications. The processor 1210 may receive an indication of a subscription request for the combined service from a consumer via a SaaS marketplace and access, responsive to the received indication, a dependent service framework of the unified provisioning service. The processor 1210 may then receive dependency subscription data from the unified provisioning service, and, based on the dependency subscription data, arrange for the consumer to be subscribed to each of the plurality of multi-tenant cloud applications.

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores a dependency configuration data store 1300. An example of a database that may be used in connection with the platform 1200 will now be described in detail with respect to FIG. 13. Note that the database described herein is only one example, and additional and/or different information may be stored therein. Moreover, various databases might be split or combined in accordance with any of the embodiments described herein.

Figure 13:
FIG. 13 is portion of a dependency configuration data store in accordance with some embodiments.

Referring to FIG. 13, a table is shown that represents the dependency configuration data store 1300 that may be stored at the platform 1200 according to some embodiments. The table may include, for example, entries associated with combined services that might be offered in a cloud computing environment. The table may also define fields 1302, 1304, 1306, 1308, 1310 for each of the entries. The fields 1302, 1304, 1306, 1308, 1310 may, according to some embodiments, specify: a combined service identifier 1302, a description 1304, integration service identifiers 1306, subscriber identifiers 1308, and tenant and Uaa information 1310. The dependency configuration data store 1300 may be created and updated, for example, when new applications are added to a system, new combinations are deployed, etc.

The combined service identifier 1302 might be a unique alphanumeric label that is associated with a combination of applications that are offered to a consumer in a unified way. The description 1304 might describe that package of service and the integration service identifiers 1306 may identify which applications are included in the combination (e.g., the dependencies). The subscriber identifiers 1308 might indicate which consumers have subscribed to the combination, and the tenant and Uaa information 1310 may provide additional information about those consumers.

Thus, embodiments may provision a combined set of applications for a multi-tenant cloud computing environment in a secure, automatic, and efficient manner. Moreover, embodiments may offer a software design that brings packaged services in a dependent service construct and provides a single click provisioning of all the services (and give a UI tool to manage it centrally).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of integration services and microservices, any of the embodiments described herein could be applied to other types of applications. Moreover, the displays shown herein are provided only as examples, and any other type of user interface could be implemented. Any of the embodiments described herein may provide a provisioning for a transport management system and alert notification service. Moreover, embodiments might implement metering (e.g., billing)

and upsell of business transactions, multiple subscriptions for the same subaccount, entitlement management and restriction, integration of API access points (e.g., service brokers), role harmonization, SPC integration, service broker integration, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment, comprising:
    a unified provisioning service, including:
        a plan configuration data store, using a convention over configuration approach that stores information as a Domain Specific Language ("DSL"), containing information for a combined service that represents a plurality of multi-tenant cloud applications; and
    a cloud platform provisioning framework, coupled to the unified provisioning service, including:
        a computer processor, and
        computer memory, coupled to the computer processor, storing instructions that, when executed by the computer processor cause the cloud platform provisioning framework to:
            (i) receive, via a Software as a Service ("SaaS") marketplace, an indication of a subscription request for the combined service, the indication of the received subscription request being invoked by a selection of a combined service tile representation for the combined service in the SaaS marketplace,
            (ii) access, responsive to the received indication, a dependent service framework of the unified provisioning service,
            (iii) receive dependency subscription data for the plurality of multi-tenant cloud applications of the combined service of the subscription request from the unified provisioning service,
            (iv) based on the dependency subscription data, use parent and dependencies notifiers to subscribe the consumer to the plurality of multi-tenant cloud applications, and
            (v) generate using the DSL, a presentation of URLs corresponding to the subscribed to plurality of multi-tenant cloud applications.

2. The system of claim 1, wherein the subscriptions are associated with applications to be executed in a microservice-based cloud computing environment.

3. The system of claim 1, wherein the selection of the combined service tile in the SaaS marketplace is initiated by the consumer.

4. The system of claim 1, wherein the cloud platform provisioning framework includes a user account and authorization service.

5. The system of claim 1, further comprising:
    the unified provisioning service, including:
    the dependency service framework, and
    a unified provisioning user interface application coupled to the dependency service framework.

6. The system of claim 5, wherein the dependency service framework further includes:
    a dependency configurator,
    a dependency subscriber coupled to the dependency configurator, and
    a dependency user interface generator coupled to the dependency configurator.

7. The system of claim 6, wherein the unified provisioning service further includes:
    a user account and authentication service coupled to the unified provisioning user interface application, and
    a plan configuration coupled to the unified provisioning user interface application.

8. The system of claim 1, wherein subscribing the consumer to the plurality of multi-tenant cloud applications is performed by exchanging information with service provisioning services, each service provisioning service including:
    a SaaS re-use service,
    a user account and authorization service coupled to the SaaS re-use service, and
    a user interface application coupled to the user account and authorization service.

9. The system of claim 1, wherein the cloud platform provisioning framework provides lifecycle management of the combined service for the consumer.

10. A computer-implemented method associated with a cloud computing environment, comprising:
    storing, in a plan configuration data store that uses a convention over configuration approach that stores information as a Domain Specific Language ("DSL"), of a unified provisioning service, information for a combined service representing plurality of multi-tenant cloud applications;
    receiving at a cloud platform provisioning framework, via a Software as a Service ("SaaS") marketplace, an indication of a subscription request for the combined service, the indication of the received subscription request being invoked by a selection of a combined service tile representation for the combined service in the SaaS marketplace;
    accessing, responsive to the received indication, a dependent service framework of the unified provisioning service;
    receiving, at the cloud platform provisioning framework, dependency subscription data for the plurality of multi-tenant cloud applications of the combined service of the subscription request from the unified provisioning service;
    based on the dependency subscription data, using parent and dependencies notifiers to subscribe the consumer to the plurality of multi-tenant cloud applications by exchanging information with service provisioning services, each service provisioning service including:
        a SaaS re-use service,
        a user account and authorization service coupled to the SaaS re-use service, and
        a user interface application coupled to the user account and authorization service; and
    generating using the DSL, a presentation of URLs corresponding to the subscribed to plurality of multi-tenant cloud applications.

11. The method of claim 10, wherein the subscriptions are associated with applications to be executed in a microservice-based cloud computing environment.

12. The method of claim 10, wherein the selection of the combined service tile in the SaaS marketplace is initiated by the consumer.

13. The method of claim 10, wherein the cloud platform provisioning framework includes a user account and authorization service.

14. A non-transitory, computer-readable medium storing instructions, that, when executed by a processor, cause the processor to perform a method associated with a cloud computing environment, the method comprising:
- storing, in a plan configuration data store that uses a convention over configuration approach that stores information as a Domain Specific Language ("DSL"), of a unified provisioning service, information for a combined service representing a plurality of multi-tenant cloud applications;
- receiving at a cloud platform provisioning framework, via a Software as a Service ("SaaS") marketplace, an indication of a subscription request for the combined service, the indication of the received subscription request being invoked by a selection of a combined service tile representation for the combined service in the SaaS marketplace;
- accessing, responsive to the received indication, a dependent service framework of the unified provisioning service;
- receiving, at the cloud platform provisioning framework, dependency subscription data for the plurality of multi-tenant cloud applications of the combined service of the subscription request from the unified provisioning service;
- based on the dependency subscription data, using parent and dependencies notifiers to subscribe the consumer to the plurality of multi-tenant cloud applications; and
- generating using the DSL, a presentation of URLs corresponding to the subscribed to plurality of multi-tenant cloud applications.

15. The medium of claim 14, wherein the selection of the combined service tile in the SaaS marketplace is initiated by the consumer.

16. The medium of claim 14, wherein the cloud platform provisioning framework provides lifecycle management of the combined service for the consumer.

* * * * *